United States Patent [19]

Schellenberger et al.

[11] Patent Number: 4,610,805
[45] Date of Patent: Sep. 9, 1986

[54] NEMATIC LIQUID CRYSTAL MIXTURES

[75] Inventors: Michael Schellenberger, Leipzig; Sabine Richter, Genthin; Hans-Joachim Deutscher, Halle; Horst Zaschke, Halle; Dietrich Demus, Halle, all of German Democratic Rep.

[73] Assignee: VEB Werk für Fernsehelektronik im VEB Kombinat Mikroelektronik, Berlin, German Democratic Rep.

[21] Appl. No.: 696,138

[22] Filed: Jan. 29, 1985

[30] Foreign Application Priority Data

Feb. 16, 1984 [DD] German Democratic Rep. ... 260127

[51] Int. Cl.[4] .................. C09F 3/34; G02F 1/13; C07C 69/75; C07C 69/753; C07C 69/76; C07C 121/52; C07C 121/60
[52] U.S. Cl. .................. 252/299.62; 252/299.63; 252/299.5; 350/350 R; 350/350 S; 558/416; 560/1; 560/8; 560/61; 560/73; 560/98; 560/100; 560/102; 560/107; 560/117; 560/118; 560/119
[58] Field of Search ............ 252/299.62, 299.63, 252/299.5; 350/350 R, 350 S; 260/465 D, 465 F, 465 R; 560/61, 73, 98, 100, 102, 107, 117, 118, 119, 8, 1

[56] References Cited

U.S. PATENT DOCUMENTS

| | | | |
|---|---|---|---|
| 4,212,762 | 7/1980 | Dubois et al. | 252/299.64 |
| 4,400,293 | 8/1983 | Romer et al. | 252/299.5 |
| 4,419,263 | 12/1983 | Praefcke et al. | 252/299.63 |
| 4,472,592 | 9/1984 | Takatsu et al. | 252/299.65 |
| 4,480,117 | 10/1984 | Takatsu et al. | 252/299.5 |
| 4,510,069 | 4/1985 | Eidenschime et al. | 252/299.63 |
| 4,514,044 | 4/1985 | Gunjima et al. | 252/299.5 |
| 4,526,704 | 7/1985 | Petrzilka et al. | 252/299.65 |
| 4,550,981 | 11/1985 | Petrzilka et al. | 252/299.65 |
| 4,556,745 | 12/1985 | Carr et al. | 252/299.6 |
| 4,558,151 | 12/1985 | Takatsu et al. | 252/299.63 |

FOREIGN PATENT DOCUMENTS

| | | | |
|---|---|---|---|
| 3317597 | 11/1984 | Fed. Rep. of Germany | 252/299.63 |
| 2092169 | 8/1982 | United Kingdom | 252/299.61 |

Primary Examiner—Teddy S. Gron
Attorney, Agent, or Firm—Jordan and Hamburg

[57] ABSTRACT

Nematic liquid crystalline mixtures, which can be used in optoelectronic components. Compounds are provided which influence the characteristics of mixtures in the direction of high clarification temperatures at simultaneous favorable switching times. It has been found that compounds of the general formula

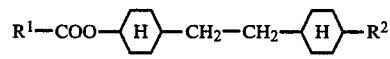

wherein $R^1 = C_nH_{2n+1}$ 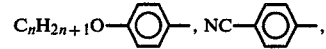

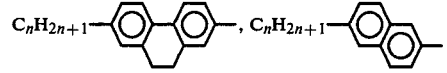

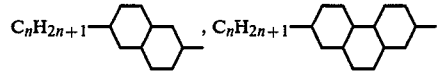

$R^2 = C_mH_{2m+1}$ wherein n, m=1 to 10 in nematic mixtures in quantities of 5 to 40% considerably increase the clarification points without significantly increasing the viscosity, so that favorable switching times are obtained. The new mixtures can be used for the production of optoelectronic components (displays) for watches, computers and other devices.

10 Claims, No Drawings

NEMATIC LIQUID CRYSTAL MIXTURES

BACKGROUND OF THE INVENTION AND PRIOR ART STATEMENT

The invention relates to nematic liquid crystalline mixtures for the use in optoelectronic components (displays) for the modulation of passing or transmitted light, as well as for the rendition of numbers, symbols and images. The invention can be used for the production of optoelectronic components (displays) for watches, computers, and other devices.

A great number of liquid crystalline, predominantly nematic, compounds are known; (D. Demus, H. Demus, H. Zaschke: Flüssige Kristalle in Tabellen, VEB Deutscher Verlag für Grundstoffindustrie Leipzig, 2. edition. 1976). None of the known compounds have in their pure state characteristics, which would allow using them directly in optoelectronic components. It is known, however, that by mixing several compounds, the characteristics can be changed so that the melting and clarification temperatures, the threshold voltage, the dielectric and optical anisotropy, the viscosity and other characteristics allow utilization of the mixture in optoelectronic components. New components are constantly needed for changing the characteristics of the mixtures, in order to improve the mixtures in the direction required by the new technical developments. One of the important objects consists thereby in obtaining mixtures of high clarification temperatures, however, by simultaneously obtaining favorable switching times. In order to obtain high clarification temperatures, substances having an extensive linear ring system can be added whereby, however, also the viscosity and thus the switching times are strongly increased. (H. Kelker, R. Hatz: Handbook of Liquid Crystals, Publisher Chemie, Weinheim 1980).

SUMMARY OF THE INVENTION

The object of the invention is to provide substances which influence the characteristics of mixtures in the direction of high clarification temperatures at simultaneous favorable switching times.

The technical problem and another object of the invention is finding suitable liquid crystalline mixing components.

These and other objects and advantages of the present invention will become evident from the description which follows.

It has been found, that compounds having the general formula

R$^1$—COO—⟨H⟩—CH$_2$—CH$_2$—⟨H⟩—R$^2$ wherein R$^1$ = $C_nH_{2n+1}$—⟨H⟩—, $C_nH_{2n+1}$—⟨O⟩—, $C_nH_{2n+1}$O—⟨O⟩—, NC—⟨O⟩—,

-continued

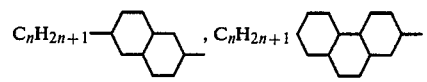

R$^2$ = $C_mH_{2m+1}$ whereby n, m=1 to 10, present in nematic mixtures in quantities of 5 to 40%, considerably increase the clarification points, without thereby considerably increasing the viscosity, so that favorable switching times result.

Most of the new compounds are smectic in their pure states, however, they are nematic in suitable mixtures, and thus can be used for optoelectronic components, for instance, on the basis of the TNP effect.

The new compounds are colorless and very stable with regard to humidity, heat and electrical fields.

The new compounds are obtained by converting 4-methoxyphenylacetic acid and alkylbenzenes, as well as subsequent reduction to a substituted diphenylethane, which after ether splitting by means of high-pressure hydrogenation at first hydrogenates to a substituted di-cyclohexyl-ethane II, and subsequently is esterified with an acid chloride to a 1-(4-acyloxy-cyclohexyl)-2-(4-alkylcyclohexyl)-ethane III.

DETAILED DESCRIPTION OF THE PREFERRED EMBODIMENTS

EXAMPLES

For example, the new compounds can be produced as follows:

The synthesis proceeds according to the following schematic representation:

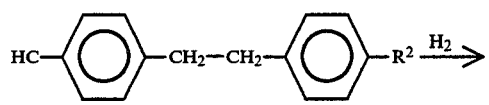

I

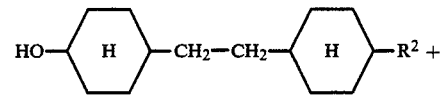

II

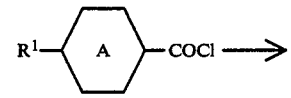

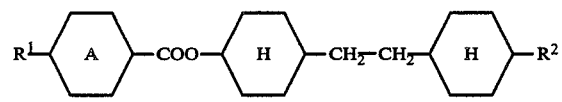

III

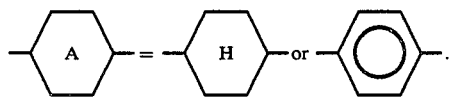

The substituted phenol I is produced according to known methods from 4-methoxyphenylacetic acid and alkylbenzenes.

Synthesis of the 4-(4-pentylcyclohexyl-ethyl)-cyclohexanol II:

28 g (0.096 mol) 4-[2-(4-pentylcyclohexyl)-ethyl]-phenol are dissolved in 300 ml absolute alcohol and mixed with 50 g RANEY-Nickel. At 12.6 MPa (125 at) hydrogen pressure and 15° C., the product is shaken in the autoclave approximately for 10 hours until there is no longer observed any pressure decrease. After cooling the reaction vessel, the catalyst is separated from the solvent, and the solvent is removed at the rotary evaporator. A constant boiling, syrup-like liquid is obtained after fractional distillation.

The boiling point is 180° C. at 0.2 Torr. The yields of the hydrogenated product lie at 75%.

Esterification:

2.82 g (0.01 mol) of the cyclohexanol II are dropwise mixed in 50 ml dry pyridine with the equimolar quantity of acid chloride. After stirring well, the preparation is let to stand at ambient temperature for 12 hours, and then while stirring, is heated for 5 to 6 hours in a water bath. The cooled reacted mixture is poured over ice water combined with sulfuric acid and is finished as usual.

The esters III are recrystallized from methanol up to the constancy of the melting and phase transition temperatures.

With regard to the characteristic of the new compounds, Table 1 indicates the transformation temperatures of a few substances of the general formula

TABLE 1

$R^1-COO-\langle H \rangle-CH_2-CH_2-\langle H \rangle-R^2$

| Comp. | $R^1$ | $R^2$ | K | $S_B$ | N | is |
|---|---|---|---|---|---|---|
| 1 | $C_4H_9O$—⌬— | $C_4H_9$ | .44 | — | .126 | . |
| 2 | $C_4H_9O$—⌬— | $C_2H_5$ | .66 | — | .134 | . |
| 3 | $C_5H_{11}O$—⌬— | $C_2H_5$ | .58 | — | .117 | . |
| 4 | $C_6H_{13}O$—⌬— | $C_2H_5$ | .64 | — | .118 | . |
| 5 | $C_4H_9$—⌬— | $C_5H_{11}$ | .34 | .183 | — | . |

TABLE 1-continued $R^1-COO-\langle H \rangle-CH_2-CH_2-\langle H \rangle-R^2$

| Comp. | $R^1$ | $R^2$ | K | $S_B$ | N | is |
|---|---|---|---|---|---|---|
| 6 | $C_4H_9$—⟨H⟩— | $C_5H_{11}$ | .40 | .187 | — | . |
| 7 | $CN$—⌬— | $C_4H_9$ | .103 | — | .143 | . |
| 8 | $C_2H_5$—⟨H⟩— | $C_5H_{11}$ | .45 | .169 | — | . | wherein
K = crystalline solid
$S_B$ = smectic B
N = nematic
is = isotropic

Table 2 indicates the transformation temperatures of a few substances of the general formula

TABLE 2

$R^1-COO-⌬-CH_2-CH_2-⌬-R^2$.

| Comp. | $R^1$ | $R^2$ | K | S | N | is |
|---|---|---|---|---|---|---|
| 9 | $C_4H_9$—⌬⌬— | $C_2H_5$ | .99 | — | .223 | . |
| 10 | $CN$—⌬— | $C_5H_{11}$ | .118 | — | .164 | . |
| 11 | $C_4H_9O$—⌬— | $C_8H_{17}$ | .83 | — | .122 | . |

The following example is intended for the explanation of the favorable changes of the characteristics occurring when the substances according to the invention are added:

Mixture A has the following composition:
4-n-propylcyclohexane-carboxylic-acid-4-cyanophenylester 34.5 mol-%
4-n-butylcyclohexane-carboxylic-acid-4-cyanophenylester 31.0 mol-%
4-n-pentylcyclohexane-carboxylic-acid-4-cyanophenylester 34.5 mol-%.

To this mixture, a few of the mentioned substances according to the invention have been added; the resulting changes of the characteristics are summarized in Table 3.

TABLE 3

| Comp. No. | Mi mol-% | A mol-% | Klp. /°C./ | Fp. /°C./ | $\eta$ /cP/ | $U_o$ /v/ | $\tau_E 50$ /ms/ | $\tau_A 50$ /ms/ | d /μm/ |
|---|---|---|---|---|---|---|---|---|---|
| — | — | 100 | 72 | 10–14 | 31.1 | 1.3 | 90 | 227 | 24 |
| 5 | 10 | 90 | 84 | | 38.3 | — | — | — | — |

TABLE 3-continued

| Comp. No. | mol-% | Mi A mol-% | Klp. /°C./ | Fp. /°C./ | $\eta$ /cP/ | $U_o$ /v/ | $\tau_E 50$ /ms/ | $\tau_A 50$ /ms/ | d /$\mu$m/ |
|---|---|---|---|---|---|---|---|---|---|
| 6 | 10 | 90 | 84 | — | 1.6 | 290 | 500 | 22.5 |
| 8 | 10 | 90 | 83 | 35.1 | — | — | — | | wherein
Klp. = clarification point
Fp. = melting point
$\eta$ = viscosity at 25° C.,
$U_o$ = threshold voltage 20° C., 500 Hz
$\tau_E 50$ = switching-on time U = 2 $U_o$, 20° C., 500 Hz
$\tau_A 50$ = (switching-off time) decay period
d = thickness of layer In order to verify the increase of the clarification point, to a mixture B consisting of

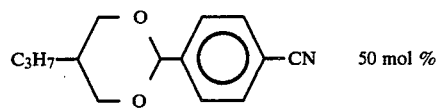   50 mol %

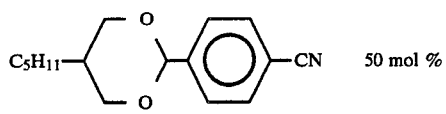   50 mol % there have been added 10 mol-% of the substance No. 5. Table 4 indicates the result.

TABLE 4

| Comp. No. | mol-% | Mi B mol-% | Klp./°C./ |
|---|---|---|---|
| — | — | 100 | 43 |
| 5 | 10 | 90 | 54 |

The clarification points of the here examined mixtures behave according to a linear function of the concentration.

The melting enthalpies have been determined for two substances, the values thereof are indicated in Table 5.

TABLE 5

| Comp. No. | $\Delta_F H/kJ.mol^{-1}$/ |
|---|---|
| 5 | 22 |
| 6 | 16.55 |

These very low values of the melting enthalpies signify a considerable lowering of the melting points in mixtures and thus a great range of existence of the nematic phase.

It thus will be seen that there are provided nematic liquid crystalline mixtures which attain the various objects of the invention, and which are well adapted for the conditions of practical use. As numerous alternatives within the scope of the present invention, besides those alternatives, variations, embodiments and equivalents mentioned supra, will occur to those skilled in the art, it will be understood that the invention extends fully to all such equivalents and the like, and it is to be limited only by the scope of the appended claims, and functional and structural equivalents thereof.

We claim:

1. A nematic liquid crystalline mixture for use in optoelectronic components, comprising a mixture of nematic liquid crystalline compounds, together with at least one compound of the general formula

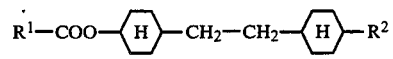

wherein $R^1 =$ 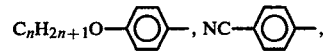

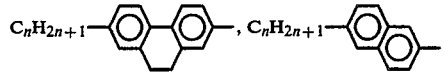

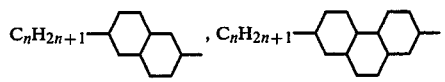

and $R^2 = C_m H_{2m+1}$ wherein n, m = 1 to 10, said at least one compound being contained in the mixture in quantities of 5 to 40% of the total nematic liquid crystalline mixture.

2. Nematic liquid crystalline mixture according to claim 1, wherein $R_1$ signifies

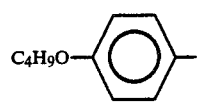

and $R_2 = C_4 H_9$—.

3. Nematic liquid crystalline mixture according to claim 1, wherein $R_1$ signifies

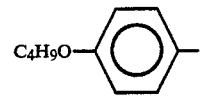

and $R_2 = C_2 H_5$—.

4. Nematic liquid crystalline mixture according to claim 1, wherein $R_1$ signifies

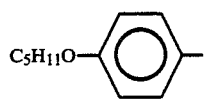

and $R_2 = C_2 H_5$—.

5. Nematic liquid crystalline mixture according to claim 1, wherein $R_1$ signifies

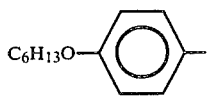

and $R_2=C_2H_5-$.

6. Nematic liquid crystalline mixture according to claim 1, wherein $R_1$ signifies

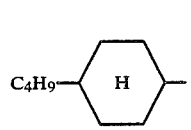

and $R_2=C_5H_{11}-$.

7. Nematic liquid crystalline mixture according to claim 1, wherein $R_1$ signifies

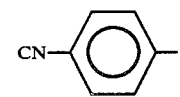

and $R_2=C_5H_{11}-$.

8. Nematic liquid crystalline mixture according to claim 1, wherein $R_1$ signifies and $R_2=C_4H_9-$.

9. Nematic liquid crystalline mixture according to claim 1, wherein $R_1$ signifies

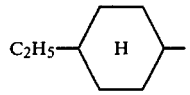

and $R_2=C_5H_{11}-$.

10. A compound of the general formula:

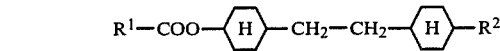

wherein 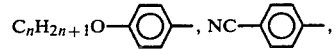

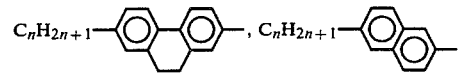

and $R^2 = C_mH_{2m+1}$ wherein n, m=1 to 10, said compound, when added as a component to a nematic liquid crystalline mixture, providing a formulation in which the characteristics of said mixture are influenced and modified in the direction of high clarification temperatures and points, without substantially increasing the viscosity of the mixture, so that simultaneous favorable switching times are obtained.

* * * * *